Aug. 27, 1968     R. B. YOUNG     3,399,016
METALLURGICAL MICROSCOPE OBJECTIVE
Filed Sept. 17, 1965
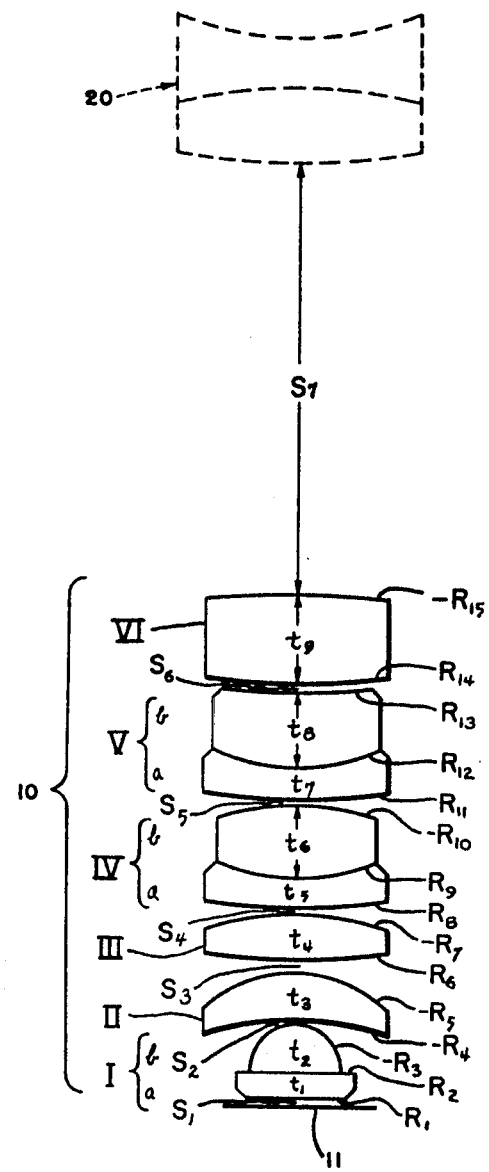
RALPH B. YOUNG
INVENTOR
BY Frank C. Parker
ATTORNEY _United States Patent Office_

3,399,016
Patented Aug. 27, 1968

3,399,016
METALLURGICAL MICROSCOPE OBJECTIVE
Ralph B. Young, Henrietta, N.Y., assignor to Bausch & Lomb Incorporated, Rochester, N.Y., a corporation of New York
Filed Sept. 17, 1965, Ser. No. 488,112
2 Claims. (Cl. 350—214)

The present invention relates to an optical objective for use on metallographs and the like and more particularly it relates to improvements therein.

Optical objectives of the kind generally described herebelow have been disclosed in a copending application of Harold E. Rosenberger, Ser. No. 408,875, filed Nov. 4, 1964, and having the same assignee, wherein is described in particular a superior microscope objective for use with biological specimens which are usually diascopically illuminated by transmitted light. It has been discovered that when such a biological objective is used in metallurgical microscopes where the specimen is opaque and has a specular surface, specular light reflected from said surface is degraded by the simultaneous ghost reflections caused by the incidence of illuminating light upon the air-glass lens surfaces in the objective. Furthermore, anti-reflection coating when applied to said air-glass lens surfaces may reduce but does not eliminate the above-described difficulty.

In view of the foregoing statements, it is an object of the present invention to provide a microscope semi-objective of the kind described in the above-mentioned patent application having together with a 5× corrector lens substantially 100.0× overall magnification wherein ghost reflections from air-glass lens surfaces therein are either eliminated or are reduced to an innocuous condition.

It is a further object to provide such an objective having a very flat field and low distortion along with a superior degree of correction for astigmatism, coma and spherical image abberations.

Further objects and advantages will be found in the arrangement and detailed structure of the parts of said objective by reference to the following specification and the accompanying drawing wherein the single figure is an optical diagram showing a preferred form of said invention.

The present microscope semi-objective per se is rated at 20.0× magnification and is designated in the drawing generally by the numeral 10. It is a member of a group of related metallographic semi-objectives having different magnification ratings which are interchangeably used in common with a single negative form corrector lens of 5× magnification as described in the aforementioned application of Rosenberger. Said corrector lens is designated by numeral 20 in the drawing and its magnification rating of 5×. When combined with the 20.0× magnification of the present semi-objective, it produces a total magnification of 100.0× for the entire objective and corrects certain aberrations in the imaging properties of said semi-objective in the same manner as recited in the cited patent application. Corrector lens 20 is located on the optical axis of the semi-objective at a fixed distance $S_7$ rearwardly from the semi-objective 10.

According to the present invention, the form and arrangement of the lens members of said semi-objective 10 as well as the constructional details thereof are all so chosen that the aforesaid ghost reflections are reduced to an innocuous condition while coincidentally a good state of correction of image aberrations is achieved.

Comprised in said semi-objective 10 is a front compound lens member designated I which is located at an axial distance designated $S_1$ rearwardly from an object or specimen surface 11. Lens member I is composed of a front plano parallel plate Ia and a rear plano convex lens element Ib, the plano surface of which is held in contact with said plate Ia. The axial thicknesses of the elements Ia and Ib are designated $t_1$ and $t_2$ respectively.

Spaced rearwardly from lens member I at an axial distance designated $S_2$ is a singlet lens member designated II having a positive meniscus form, the distance $S_2$ being quite critical in its adjustment. The axial thickness of lens member II is designated $t_3$.

Rearwardly of lens member II is spaced a second singlet lens member designated III at an axial distance denoted by $S_3$. The form of said member III is double convex and its axial thickness is represented by $t_4$. The control of image aberrations is quite sensitive to the adjustment of the air space $S_3$ although the air space $S_2$ is the more critical of adjustment.

Located at a small axial distance designated $S_4$ rearwardly of member III is a second compound lens member designated IV which comprises a front negative meniscus element designated IVa which lies in contact with a rear double convex element IVb. The axial thicknesses of elements IVa and IVb are $t_5$ and $t_6$ respectively.

A third compound lens member designated V is located at a fixed axial distance which is denoted $S_5$ rearwardly of lens member IV, said member comprising a front negative meniscus element designated Va and a positive meniscus element designated Vb which lies in contact with the rear surface of the front element. The axial thicknesses of elements Va and Vb are designated respectively $t_7$ and $t_8$.

Most rearwardly in the semi-objective 10 is a double convex singlet lens member designated VI which is spaced at an axial distance designated $S_6$ from member V. It has an axial thickness designated $t_9$.

The constructional data for the semi-objective 10 is given in Table I of values herebelow, said values being stated in terms of F which represents the equivalent focal length of semi-objective 10 in combination with the corrector lens 20, said values further being practical and effective in producing within the ranges stated an objective having excellent performance characteristics. The values are given for the successive lens radii $R_1$ to $-R_{15}$ of the successive lens members I to VI, the minus (—) sign used with certain values meaning that the center of curvature of that surface lies on the object side thereof, the values further being given for the focal lengths of the successive lens members I to VI and for the successive lens elements $F_{Ia}$ to $F_{Vb}$, the minus (—) sign used with certain focal lengths meaning negative values, the successive axial thicknesses $t_1$ to $t_9$ of said lens elements, the successive axial spaces $S_1$ to $S_7$ surrounding said lens members, and lastly, the absolute values of the refractive indices $n_D(Ia)$ to $n_D(VI)$, as well as the absolute values of Abbe number $v(Ia)$ to $v(VI)$ of the glasses in the successive lens elements.

Table I $1.5707F < F_I < 1.7700F$
$6.7794F < F_{II} < 7.5117F$
$8.6848F < F_{III} < 9.6360F$
$44.6484F < F_{IV} < 48.3692F$
$24.5762F < -F_V < 26.6242F$
$16.7549F < F_{VI} < 18.1511F$
$F_{Ia} = \infty$
$1.5707F < F_{Ib} < 1.7700F$
$7.6682F < -F_{IVa} < 8.3072F$
$6.7021F < F_{IVb} < 7.2607F$
$7.4632F < -F_{Va} < 8.0852F$
$10.1790F < F_{Vb} < 11.0272F$
$R_1 =$ Plano
$R_2 =$ Plano
$1.0575F < -R_3 < 1.1007F$
$6.6731F < -R_4 < 6.9455F$ Table I.—Continued $2.8075F < -R_5 < 2.9221F$
$33.5345F < R_6 < 35.1311F$
$5.3447F < -R_7 < 5.6681F$
$24.6787F < R_8 < 25.6859F$
$4.5323F < R_9 < 4.7173F$
$13.6874F < -R_{10} < 14.2459F$
$22.9255F < R_{11} < 23.6603F$
$4.3684F < R_{12} < 4.5466F$
$20.9085F < R_{13} < 21.7619F$
$14.4653F < R_{14} < 15.0557F$
$21.2970F < -R_{15} < 22.1662F$
$.5247F < t_1 < .5799F$
$.9890F < t_2 < 1.0930F$
$1.0215F < t_3 < 1.1291F$
$1.1115F < t_4 < 1.2327F$
$.6964F < t_5 < .7698F$
$1.6251F < t_6 < 1.7961F$
$.6964F < t_7 < .7698F$
$1.6251F < t_8 < 1.7961F$
$1.9965F < t_9 < 2.2067F$
$.1276F < S_1 < .1558F$
$.0110F < S_2 < .0134F$
$.2200F < S_3 < .2688F$
$.0244F < S_4 < .0733F$
$.0244F < S_5 < .0733F$
$.0733F < S_6 < .1222F$
$8.7096F < S_7 < 10.6450F$ $1.6667 < n_D(Ia) < 1.6733$
$1.6168 < n_D(Ib) < 1.6232$
$1.6168 < n_D(II) < 1.6232$
$1.5110 < n_D(III) < 1.5170$
$1.7166 < n_D(IVa) < 1.7234$
$1.5110 < n_D(IVb) < 1.5170$
$1.7166 < n_D(Va) < 1.7234$
$1.5110 < n_D(Vb) < 1.5170$
$1.5110 < n_D(VI) < 1.5170$
$47.11 < \nu(Ia) < 47.29$
$60.18 < \nu(Ib) < 60.42$
$60.18 < \nu(II) < 60.42$
$69.86 < \nu(III) < 70.14$
$29.24 < \nu(IVa) < 29.36$
$69.86 < \nu(IVb) < 70.14$
$29.24 < \nu(Va) < 29.36$
$69.86 < \nu(Vb) < 70.14$
$69.86 < \nu(VI) < 70.14$
} Absolute values More specifically, the values of the lens parameters for one successful form of the semi-obective 10 are stated in terms of F in Table II herebelow wherein the symbolism is the same as Table I. It will be understood that other specific sets of values which define different specific semi-obectives of good optical performance are possible within the ranges of values specified in Table I.

Table II $F_I = 1.7404F$
$F_{II} = 7.2228F$
$F_{III} = 9.2654F$
$F_{IV} = 46.5088F$
$-F_V = 25.6002F$
$F_{VI} = 17.4530F$
$F_{Ia} = \infty$
$F_{Ib} = 1.7404F$
$-F_{IVa} = 7.9877F$
$F_{IVb} = 6.9814F$
$-F_{Va} = 7.7742F$
$F_{Vb} = 10.6031F$
$t_1 = .5523F$
$t_2 = 1.0410F$
$t_3 = 1.0753F$
$t_4 = 1.1740F$
$t_5 = .7331F$
$t_6 = 1.7106F$ $t_7 = .7331F$
$t_8 = 1.7106F$
$t_9 = 2.1016F$
$R_1 = $ Plano
$R_2 = $ Plano
$-R_3 = 1.0791F$
$-R_4 = 6.8093F$
$-R_5 = 2.8648F$
$R_6 = 34.4423F$
$-R_7 = 5.4589F$
$R_8 = 25.1823F$
$R_9 = 4.6248F$
$-R_{10} = 13.9667F$
$R_{11} = 23.3934F$
$R_{12} = 4.4575F$
$R_{13} = 21.3352F$
$R_{14} = 14.7605F$
$-R_{15} = 21.7316F$ $S_1 = .1417F$
$S_2 = .0122F$
$S_3 = .2444F$
$S_4 = .0488F$ $S_5 = .0488F$
$S_6 = .0977F$
$S_7 = 9.6773F$ $n_D(Ia) = 1.670$
$n_D(Ib) = 1.620$
$n_D(II) = 1.620$
$n_D(III) = 1.514$
$n_D(IVa) = 1.720$
$n_D(IVb) = 1.514$
$n_D(Va) = 1.720$
$n_D(Vb) = 1.514$
$n_D(VI) = 1.514$
} Absolute values $\nu(Ia) = 47.2$
$\nu(Ib) = 60.3$
$\nu(II) = 60.3$
$\nu(III) = 70.0$
$\nu(IVa) = 29.3$
$\nu(IVb) = 70.0$
$\nu(Va) = 29.3$
$\nu(Vb) = 70.0$
$\nu(VI) = 70.0$
} Absolute values With regard to Table I, it will be seen that the value of each optical parameter is given as a range of values which includes a nominal or ideal value. The ranges of values for the respective optical parameters are prescribed for the primary purpose of facilitating manufacture of the lens elements. It is well known in the art that it is practically impossible to manufacture a production run of lens elements economically while holding all of the lens parameters to specific and ideal values. Therefore, the lens designer specifies tolerances or ranges of values for each lens parameter within which the lens parts may be manufactured economically and nevertheless produce a completed objective which is capable of good optical performance. The technique used by the manufacturer is to separate out the lens elements which fall within said ranges of values and selectively assemble from these elements a complete semi-objective 10. This technique is highly successful in producing economically a good optical system. Said ranges of values are the ranges specified in Table I.

From the foregoing description it will be perceived that a semi-objective of 100× is provided which is capable of high quality optical performance and additionally is producable by comparatively low-cost manufacturing operations and fulfills the stated objects of the present invention.

Although only a single form of the invention has been given with particularity, other forms are possible and changes may be made therein within the foregoing specifications without departing from the spirit of the invention as defined in the claims appearing herebelow.

I claim:

1. A microscope semi-objective having a combined positive power of 100× and numerical aperture of 1.25 when used with a rearwardly aligned corrector lens of 5× magnification, said semi-objective comprising a compound front lens member designated I and consisting of a plano parallel plate Ia which lies in contact with a rear plano convex lens element Ib, the axial thicknesses of elements Ia and Ib being designated respectively $t_1$ and $t_2$, the lens member I being spaced at an axial distance designated $S_1$ rearwardly from an object surface, a concavo-convex singlet lens member designated II which is spaced rearwardly from member I at an axial distance designated $S_2$ and has an axial thickness designated $t_3$, a second singlet lens member designated III of double convex form which is axially spaced from lens member II at a distance designated $S_3$, a positive doublet lens member designated IV which is spaced rearwardly from member III by a distance designated $S_4$, member IV being comprised of a front negative meniscus lens element denoted IVa which lies in contact with a rear double-convex lens element denoted IVb, the axial thicknesses of the elements IVa and IVb being designated $t_5$ and $t_6$ respectively, a negative doublet lens member designated V which is spaced from member IV at an axial distance designated $S_5$ and is comprised of a negative meniscus lens element designated V$a$ which lies in contact with a rear positive meniscus element which is designated V$b$, the axial thicknesses of the elements V$a$ and V$b$ being designated $t_7$ and $t_8$ respectively, and in rearmost position a singlet lens member designated VI of double convex form is spaced at an axial distance from member V which is designated $S_6$, the axial thickness thereof being denoted $t_9$, the specific values for the lens parameters of said semi-objective being given substantially in the table herebelow wherein $F_I$ to $F_{VI}$ represent the equivalent focal lengths of lens members I to VI respectively, and their lens elements $F_{Ia}$, $F_{Ib}$, $F_{IVa}$, $F_{IVb}$, $F_{Va}$, $F_{Vb}$, the minus (—) sign denoting negative focal lengths, the table further including the specific values for the aforesaid lens thicknesses $t_1$ to $t_9$ and spaces $S_1$ to $S_7$ said values being given in terms of F which is the combined focal length of said semi-objective and said corrector lens, the specific absolute values furthermore being given for the refractive indices $n_D(Ia)$ to $n_D(VI)$ and the Abbe numbers $\nu(Ia)$ to $\nu(VI)$,

| | |
|---|---|
| $F_I=1.7404F$ | $S_3=.2444F$ |
| $F_{II}=7.2228F$ | $S_4=.0488F$ |
| $F_{III}=9.2654F$ | $S_5=.0488F$ |
| $F_{IV}=46.5088F$ | $S_6=.0977F$ |
| $-F_V=25.6002F$ | $S_7=9.6773F$ |
| $F_{VI}=17.4530F$ | $n_D(Ia)=1.670$ |
| $F_{Ia}=\infty$ | $n_D(Ib)=1.620$ |
| $F_{Ib}=1.7404F$ | $n_D(II)=1.620$ |
| $-F_{IVa}=7.9877F$ | $n_D(III)=1.514$ |
| $F_{IVb}=6.9814F$ | $n_D(IVa)=1.720$ |
| $-F_{Va}=7.7742F$ | $n_D(IVb)=1.514$ |
| $F_{Vb}=10.6031F$ | $n_D(Va)=1.720$ |
| $t_1=.5523F$ | $n_D(Vb)=1.514$ |
| $t_2=1.0410F$ | $n_D(VI)=1.514$ |
| $t_3=1.0753F$ | $\nu(Ia)=47.2$ |
| $t_4=1.1740F$ | $\nu(Ib)=60.3$ |
| $t_5=.7331F$ | $\nu(II)=60.3$ |
| $t_6=1.7106F$ | $\nu(III)=70.0$ |
| $t_7=.7331F$ | $\nu(IVa)=29.3$ |
| $t_8=1.7106F$ | $\nu(IVb)=70.0$ |
| $t_9=2.1016F$ | $\nu(Va)=29.3$ |
| $S_1=.1417F$ | $\nu(Vb)=70.0$ |
| $S_2=.0122F$ | $\nu(VI)=70.0$ |

2. A microscope semi-objective having a combined positive power of 100× and numerical aperture of 1.25 when used with a rearwardly aligned corrector lens of 5× magnification, said semi-objective comprising a compound front lens member designated I and consisting of a plano parallel plate I$a$ which lies in contact with a rear plano convex lens element I$b$, the axial thicknesses of elements I$a$ and I$b$ being designated respectively $t_1$ and $t_2$, the lens member I being spaced at an axial distance designated $S_1$ rearwardly from an object surface, a concavo-convex singlet lens member designated II which is spaced rearwardly from member I at an axial distance designated $S_2$ and has an axial thickness designated $t_3$, a second singlet lens member designated III of double convex form which is axially spaced from lens member II at a distance designated $S_3$, a positive doublet lens member designated IV which is spaced rearwardly from member III by a distance designated $S_4$, member IV being comprised of a front negative meniscus lens element denoted IV$a$ which lies in contact with a rear double-convex lens element denoted IV$b$, the axial thicknesses of the elements IV$a$ and IV$b$ being designated $t_5$ and $t_6$ respectively, a negative doublet lens member designated V which is spaced from member IV at an axial distance designated $S_5$ and is comprised of a negative meniscus lens element designated V$a$ which lies in contact with a rear positive meniscus element which is designated V$b$, the axial thicknesses of the elements V$a$ and V$b$ being designated $t_7$ and $t_8$ respectively, and in rearmost position a singlet lens member designated VI of double convex form is spaced at an axial distance from member V which is designated $S_6$, the axial thickness thereof being denoted $t_9$, the specific values for the lens parameters of said semi-objective being given substantially in the table herebelow wherein $R_1$ to $-R_{15}$ represent the radii of curvature of the successive lens surfaces of the lens members I to VI, the minus (—) sign meaning that the center of curvature of each such surface lies on the object side thereof, the table further including the specific values for the aforesaid thicknesses $t_1$ to $t_9$ and spaces $S_1$ to $S_7$, all of which values are given in terms of F which represents the equivalent focal length of the combined semi-objective and corrector lens, the specific absolute values furthermore being given for the refractive indices $n_D(Ia)$ to $n_D(VI)$ and the Abbe numbers $\nu(Ia)$ to $\nu(VI)$,

| | |
|---|---|
| $R_1=$Plano | $S_2=.0122F$ |
| $R_2=$Plano | $S_3=.2444F$ |
| $-R_3=1.0791F$ | $S_4=.0488F$ |
| $-R_4=6.8093F$ | $S_5=.0488F$ |
| $-R_5=2.8648F$ | $S_6=.0977F$ |
| $R_6=34.4423F$ | $S_7=9.6773F$ |
| $-R_7=5.4589F$ | $n_D(Ia)=1.670$ |
| $R_8=25.1823F$ | $n_D(Ib)=1.620$ |
| $R_9=4.6248F$ | $n_D(II)=1.620$ |
| $-R_{10}=13.9667F$ | $n_D(III)=1.514$ |
| $R_{11}=23.3934F$ | $n_D(IVa)=1.720$ |
| $R_{12}=4.4575F$ | $n_D(IVb)=1.514$ |
| $R_{13}=21.3352F$ | $n_D(Va)=1.720$ |
| $R_{14}=14.7605F$ | $n_D(Vb)=1.514$ |
| $-R_{15}=21.7316F$ | $n_D(VI)=1.514$ |
| $t_1=.5523F$ | $\nu(Ia)=47.2$ |
| $t_2=1.0410F$ | $\nu(Ib)=60.3$ |
| $t_3=1.0753F$ | $\nu(II)=60.3$ |
| $t_4=1.1740F$ | $\nu(III)=70.0$ |
| $t_5=.7331F$ | $\nu(IVa)=29.3$ |
| $t_6=1.7106F$ | $\nu(IVb)=70.0$ |
| $t_7=.7331F$ | $\nu(Va)=29.3$ |
| $t_8=1.7106F$ | $\nu(Vb)=70.0$ |
| $t_9=2.1016F$ | $\nu(VI)=70.0$ |
| $S_1=.1417F$ | |

References Cited
UNITED STATES PATENTS 3,118,964  1/1964  Buzawa.

DAVID SCHONBERG, *Primary Examiner.*

R. J. STERN, *Assistant Examiner.*